United States Patent [19]

Gillett et al.

[11] Patent Number: 4,729,868
[45] Date of Patent: Mar. 8, 1988

[54] VIBRATION ARRESTOR FOR ROD GUIDE SUPPORT STRUCTURE OF THE INNER BARREL ASSEMBLY OF A PRESSURIZED WATER REACTOR

[75] Inventors: James E. Gillett, Hempfield Township, Westmoreland County; Daniel C. Garner, Murrysville, both of Pa.

[73] Assignee: Westinghouse Electric Corp., Pittsburgh, Pa.

[21] Appl. No.: 817,362

[22] Filed: Jan. 9, 1986

[51] Int. Cl.$^4$ .............................................. G21C 1/01
[52] U.S. Cl. ..................................... 376/285; 376/353
[58] Field of Search ........................ 376/285, 353, 364

[56] References Cited

U.S. PATENT DOCUMENTS 3,736,227  5/1973  Nakazato ............................ 376/364

FOREIGN PATENT DOCUMENTS 50-22677  8/1975  Japan ................................... 376/285
1190188   4/1970  United Kingdom ................. 376/364

*Primary Examiner*—Deborah L. Kyle
*Assistant Examiner*—Richard W. Wendtland
*Attorney, Agent, or Firm*—D. C. Abeles

[57] ABSTRACT

A vibration arrestor for use in combination with the support structure for the upper ends of rod guides disposed in parallel axial relationship in an inner barrel assembly of a pressurized water reactor vessel, the rod guides being supported between a first, lower plate and a second, upper plate with their respective top ends disposed adjacent the second plate. At least for a selected type of rod guides and associated top plates, apertures provided in the top plates receive therein corresponding extensions which depend from the second plate. Each vibration arrestor comprises a central hub having a central aperature received over the depending extension for each top plate of the selected type and includes at least a pair of spring arms integral with the central hub and extending therefrom in aligned, oppositely oriented directions and depending at corresponding angles therefrom, of a common length sufficient to engage the corresponding extremities thereof on the top plates received on the extensions of the predetermined array thereof aligned with the spring arms and positioned next adjacent the extension on which the central hub is received, the spring arms exerting a compression force on the engaged top plates, within a predetermined range, for resiliently opposing any reduction of the parallel spacing of those top plates from the second plate and for reacting lateral loads tending to displace the engaged top plates in a direction parallel to the second plate.

16 Claims, 13 Drawing Figures

VIBRATION ARRESTOR FOR ROD GUIDE SUPPORT STRUCTURE OF THE INNER BARREL ASSEMBLY OF A PRESSURIZED WATER REACTOR

BACKGROUND OF THE INVENTION

1. Field of the Invention

This invention relates to pressurized water reactors and, more particularly, to a vibration arrestor for rod guides positioned within the inner barrel assembly of a pressurized water reactor.

2. State of the Prior Art

Certain advanced designs of nuclear reactors incorporate at successively higher, axially aligned elevations within the reactor vessel, a lower barrel assembly, an inner barrel assembly, and a calandria, each of generally cylindrical configuration, and an upper closure dome. The lower barrel assembly may be conventional, having mounted therein, in parallel axial relationship, a plurality of fuel rod assemblies which are supported at the lower and upper ends thereof, respectively, by corresponding lower and upper core plates. Within the inner barrel assembly there is provided a large number of rod guides disposed in closely spaced relationship, in an array extending substantially throughout the cross-sectional area of the inner barrel assembly. The rod guides are of first and second types, respectively housing therewithin reactor control rod clusters (RCC) and water displacer rodlet clusters (WDRC); these clusters, as received within their respectively associated guides, generally are aligned with the fuel rod assemblies.

The calandria includes a lower calandria plate and an upper calandria plate. The rod guides are secured in position at the lower and upper ends thereof respectively, to the upper core plate and the lower calandria plate. Within the calandria and extending between the lower and upper plates thereof is mounted a plurality of calandria tubes in parallel axial relationship and respectively aligned with the rod guides. A number of flow holes are provided in remaining portions of the calandria plates, intermediate the calandria tubes, through which passes the the reactor core outlet flow as it exits from its passage through the inner barrel assembly.

In similar parallel axial and aligned relationship, the calandria tubes are joined to corresponding flow shrouds which extend to a predetermined elevation within the dome, and which in turn are connected to corresponding head extensions which pass through the structural wall of the dome and carry, on their free ends at the exterior of and vertically above the dome, corresponding adjustment mechanisms. The adjustment mechanisms have corresponding control lines which extend through the respective head extensions, flow shrouds, and calandria tubes and are connected to the respectively associated clusters of RCC rods and WDRC rods, and serve to adjust their elevational positions within the inner barrel assembly and, particularly, the level to which same are lowered into the lower barrel assembly and thus into association with the fuel rod assemblies therein, thereby to control the activity within the core.

A critical design criterion of such reactors is to minimize wear of the rodlets at interfaces between the individual rodlets of a given cluster and known support plate structures within the rod guide through which the rodlets pass for support, and thus to reduce or eliminate the factors which produce wear, such as flow induced vibration and associated vibration of reactor internal structures. Because of the relatively dense packing of the rod guides within the inner barrel assembly, it is critical to maintain substantially uniform distribution of the outlet flow from the reactor core, and an axial direction of that flow through the upper barrel assembly. Even if a uniform, axial flow of the core outlet is achieved, the effects of differential pressure and temperature across the array of rod guides, or an individual rod guide, can produce significant reaction loads at the support points, or support connections, for the rod guides. These reactor loads, coupled with the flow induced vibrating create a high potential for wear of the rod guides, as well as the rodlets. Additionally, the provision of the calandria, and particularly the lower plate thereof, presents an interface with the top end of the rod guides which does not exist in conventional pressurized water reactors. That interface must be capable of accommodating differential thermal expansions between the lower calandria plate and the inner barrel in order to prevent large thermal stresses from developing. Furthermore, the bottom calandria plate and the upper core plate are essentially structurally independent; therefore, vibration of the internals can result in significant relative movement between the supporting connections of the rod guides at their lower and upper ends respectively to the upper core plate and the bottom calandria plate. The wear potential under these circumstances is great.

Thus, split pin connections of conventional types are inappropriate for use as the supporting connections for the top ends of the rod guides since they would wear rapidly, with the result that the top ends of the rod guides would become loose. Rod guides having such loose top end connections are unacceptable because of the rapid rate of wear of the rodlets which would result. Other known mounting devices as well are inappropriate. For example, leaf springs cannot be used to support all of the rod guides because sufficient space is not available within the inner barrel assembly to provide leaf springs of the proper size for the large number of rod guides which are present, even if high strength material is used for the leaf springs.

Beyond the unsuitability of existing, known structural support arrangements, further factors must be taken into account in the consideration of possible designs for the support of the top end of the rod guides within the inner barrel assembly. For example, both the RCC and the WDRC rod clusters should be removable without requiring that the guides be disassembled. This requirement imposes a severe space limitation in view of the dense packing of the guides and their associated rod clusters within the inner barrel assembly. For example, in one such reactor design, over 2,800 rods are mounted in 185 clusters, the latter being received within a corresponding 185 guides. The space limitation is further compounded by the requirement that unimpeded flow holes must be provided in the calandria plates for the core outlet flow. While these foregoing factors severly restrict the available space envelope in the horizontal cross-sectional dimension of the inner barrel assembly, axial or vertical limitations on this space envelope must also be considered. For example, the presence of the support members should not require any increase in the height of the vessel. From a maintenance standpoint, the support members should be visible for inspection and replaceable without undue effort. Additionally, the assembly load of the calandria must be less than its dead weight and must be accomplished without access to the support region. This avoids having to apply force to the calandria before installing the vessel head.

While the supports for the rod guides must therefore satisfy a wide range of structural and functional requirements relating to, or imposed by, the inner barrel assembly itself, a further critical requirement is that the wear potential of the support structure itself must be minimized. This is a critical requirement in view of the potential for intense vibration arising out of the core outlet flow and the development of high contact forces due to differential pressure and both steady state and transient temperature conditions across both the array of rod guides and the individual rod guides.

Conventional reactor designs do not present the support problems attendant the dense packing of rod guides and associated rod clusters in advanced reactor designs of the type herein contemplated. Thus, there is no known solution to the problems of adequately supporting the rod guides, consistent with the requirements and taking into account the environmental factors which exist in operation of such reactors as hereinabove set forth.

SUMMARY OF THE INVENTION

A pressurized water nuclear reactor, of the type with which the vibration arrestors for rod guides of the inner barrel assembly in accordance with the present invention are intended for use, employs a large number of reactor control rods, or rodlets, typically arranged in what are termed reactor control rod clusters (RCC) and, additionally, a large number of water displacer rods, or rodlets, similarly arranged in water displacer rod clusters (WDRC). For example, in one such reactor, an array of 185 such clusters containing a total of 2800 rodlets (i.e., the total of reactor control rods and water displacer rods) are mounted in parallel axial relationship within the inner barrel assembly. Each of these clusters, moreover, is received within a corresponding rod guide structure.

In operation, it is desired to maintain the core outlet flow in an axial flow condition and in a substantially uniform distribution throughout the cross-sectional area of the inner barrel assembly, as it passes through the inner barrel assembly, and thus to prevent cross-flow conditions (i.e., core flow in a direction transverse of the rod guides). This is a critical requirement in reactors of such advanced designs in which the inner barrel is densely loaded with rodlets, as before noted. The geometry of the reactor vessel itself introduces a structural anomaly which is contrary to maintaining the desired, substantially uniform axial flow condition. Particularly, the circular configuration of the reactor vessel, including the inner barrel assembly, is geometrically incompatible with the generally rectangular or square cross-sectional configuration of the individual rod guides, and correspondingly of an array thereof as stacked in closely adjacent relationship within the inner barrel assembly. Thus, in the peripheral regions between the inside diameter of the cylindrical inner barrel assembly and the outer periphery of the array of rod guides, no rodlets are present, resulting in a nonuniform flow distribution and presenting at least the potential of turbulence and cross-flow conditions with attendant problems of vibration. A related, copending application of a common one of the co-inventors herein, entitled "Modular Former For Inner Barrel Assembly Of Pressurized Water Reactoring", and assigned to the common assignee hereof, discloses an invention relating to modular formers which are configured to be mounted in these peripheral regions, to provide hydraulic resistance and thereby to maintain a primarily axial direction, and substantially uniform distribution, of the core outlet flow, throughout the length of the rod guides within the inner barrel assembly.

Thus while the state of the art, in the design of the inner barrel assembly of such advanced types of pressurized water reactors, has addressed the problem of attempting to maintain relatively stable conditions by minimizing cross-flow, e.g. by maintaining substantially uniform distribution and axial direction of the core output flow throughout the inner barrel assembly, there remains the critical problem of properly supporting the rod guides within the inner barrel because of remaining excitation forces from internal vibration and axial flow turbulence, consistent with the objectives and the structural and operating conditions and parameters as hereinabove set forth.

The vibration arrestors in accordance with the present invention, for use with rod guides of the inner barrel assembly of a pressurized water reactor, afford a highly efficient and effective structure for satisfying the critical design criteria relating to flow induced vibrations of structural components and lateral force effects, as particularly relate to the rod guides within the inner barrel assembly.

In one preferred use or application of the vibration arrestors in accordance with the present invention, they are employed in combination with a flexible rod guide support structure which is the subject of a copending application of a common inventor hereof, entitled "Flexible Rod Guide Support Structure for Inner Barrel Assembly of Pressurized Water Reactor," assigned to the common assignee hereof. Particularly, the flexible rod guide support structures as disclosed in the referenced, copending application, comprise, as major components, interdigitized matrices of top plates for the rod guides, flexible linkages which interconnect the top plates in a concatenated arrangement, pin stops between the continuous top plates of the two matrices, mounting extensions from the calandria which engage the top plates of one matrix, and rod guide leaf springs which are mounted on the calandria and which exert a force against the top plates of the one matrix to restrain lateral movement. These components are configured in a pattern that is repeated across the interface between the tops of all the rod guides in the array and the bottom plate of the calandria. Each such flexible linkage is attached to a respective WDRC rod guide top plate and to each of the RCC guide top plates which contiguously surround the respective, given WDRC rod guide top plate. Thus, each WDRC guide is attached, or concatenated, laterally to its surrounding RCC rod guides via the flexible linkage. This concatenated assembly of linkages creates a stiff structure between the guides in a plane perpendicular to the axis of the rod guides. Thus, the guides are essentially bound together laterally; however, the linkages in the out-of-plane direction, i.e., axially, are flexible and thus accommodate relative axial motion between guides to permit bowing of adjacent guides. This capability of flexibility in one plane compensates for local differences in height of adjacent guides due to differential thermal expansion and bowing due to pressure differential across the guide. Thus, the flexible linkages are flexible in a direction parallel to the axis of the rod guide, but rigid in a plane perpendicular to the axis of the rod guide. Lateral loads exerted on the rod guides are reacted into the calandria either by the calandria extensions or by the leaf springs, at each of the RCC plates. The rod guide leaf springs, as mounted on the calandria plate and pressed against the RCC top plates, generate sufficient lateral frictional force such that fluctuating steady state loads exerted on the guides do not cause slippage. Moreover, the mounting extensions from the calandria provide overall lateral support during events such as seismic, which can exceed the lateral frictional force of the leaf springs, and provide alignment between the rod guides and the calandria, there being one extension for each of the RCC guides. Collectively, the calandria extensions react the seismic loads from the rod guides. Alignment of the RCC clusters in the rod guide top plates further is controlled by the calandria extensions.

The vibration arrestors of the present invention may be of differing embodiments, two specific embodiments thereof being disclosed herein, and in either embodiment may be employed as an improvement, in the alternative to the leaf springs disclosed in the referenced, copending application. Whereas leaf springs of the type disclosed therein are appropriate choices for the function required thereof, as above described, in view of the prior experience in the use thereof in connection with fuel rod assemblies, the leaf springs present certain obstacles or disadvantages which are overcome by the vibration arrestors of the present invention. For example, the leaf springs introduce numerous individual parts (in the referenced, exemplary reactor vessel design, in excess of 2,000 parts), adding considerably to the time and cost of initial assembly and continuing maintenance expense, for a given reactor vessel installation.

The vibration arrestors in accordance with the present invention have an optimum design for use with rod guide top plates of the general configuration and mounting provisions of the RCC top plates hereinabove described, and achieve a substantial reduction in the number of parts—at the level of an order of magnitude smaller—while yielding superior structural performance at reduced stress levels. More particularly, the vibration arrestors of the present invention comprises a central hub of generally annular configuration, functioning as a mounting base, and integral spring arms which extend therefrom in a pattern which is symmetrical about the center of the hub. In one specifically disclosed embodiment of the arrestors, a single pair of two such spring arms extend in aligned and oppositely oriented directions from the hub (and thus angularly displaced by 180° about the hub). In a second embodiment, two such pairs of spring arms are formed integrally with the hub and extend therefrom in quadrature relationship. The arrestors are formed of metal of constant thickness, and each of the spring arms has a simple taper in the width dimension along the generally radial length thereof. The hub includes a central aperture by which it is received over a corresponding calandria extension. A clamping, or stiffening, ring having an outer periphery corresponding to the hub portion of the arrestor is received over the calandria extension in superposed relationship with the hub, the ring and the hub having holes extending therethrough which are positioned in alignment with corresponding threaded bores in the lower calandria plate for receiving attachment bolts thereby to secure the arrestor to the calandria.

The calandria extensions both position and laterally support the respective vibration arrestors, and thus prevent the attachment bolts from reacting lateral loads which may be imparted on the spring arms and transmitted thereby through the hub to the calandria. Moreover, the symmetrical configuration of the vibration arrestors prevents bending torques from being applied to the attachment bolts, because the compression loads applied to the ends of the symmetrically oriented spring arms are substantially the same and thus exert no net external moment. Due to the symmetrical configuration of the vibration arrestors, forces applied to the spring arms generate primarily an internal moment in the hub of the arrestor, which is made of sufficiently high strength material to withstand the stress. The clamping ring moreover reinforces the arrestor hub and prevents localized stresses therein due to attachment bolt preload effects. There results primarily only tensile loads on the bolts, with minimal, if any, shear and moment forces which is a highly desirable and acceptable condition.

The vibration arrestors of the present invention thus achieve not only a reduction in the number of parts and corresponding time and cost of assembly, relative to the leaf spring implementation, but additionally the clamping ring attachment structure and the balanced reaction to compression loads afforded by the symmetrical configuration thereof provide improved operational characteristics and enhanced reliability by substantially eliminating the bending moment on the attachment bolts.

While an exemplary application of the vibration arrestors of the present invention may be in assemblage with a flexible rod guide support structure of the type disclosed in the above identified and similarly entitled copending application, the vibration arrestors as well may be employed independently with rod guides of any desired type, and are not restricted in use to the specific interleaved matrices of first and second different types of rod guides, as disclosed in that copending application. Thus, for example, where employed independently with a given type of rod guides, such as the RCC rod guides, alternative mounting means may be employed for other types of rod guides, such as the WDRC rod guides; in such an installation, the WDRC rod guides may be supported independently, for example, by the top end support structure disclosed in the copending application entitled: "Top End Support for Water Displacement Rod Guides of Pressurized Water Reactor," having a common coinventor herewith and assigned to the common assignee hereof.

The vibration arrestors of the present invention thus afford greatly enhanced beneficial effects, corresponding and relative to the leaf springs as described in the earlier-referenced copending application; thus, the arrestors as well react lateral force components on the associated rod guides, even in the event of wear of the calandria extensions, and thus suppress top end lateral motion and correspondingly prevent any increase in the excitation of the associated rodlets. This assures that rodlet wear does not increase, despite the potential of slippage due to inadvertent wear of the rod guide support, the need for significant gaps to permit assembly, and resultant increased tolerances between adjoining parts. Likewise, the vibration arrestors of the present invention increase, by more than an order of magnitude, the allowable wear depth on the calandria extension before alignment between the rodlet clusters and respective rod guides is compromised. Further, regardless of the gap size between the calandria extension and the respective rod guide top plate, the lateral excitation of rodlets within the respective rod guides is not affected.

These and other advantages of the vibration arrestors for the rod guide supports in the inner barrel assembly of a pressurized water reactor, in accordance with the present invention, will become more apparent from the following detailed description and drawings.

DETAILED DESCRIPTION OF THE PRFFERRED EMBODIMENTS

Figure 1:
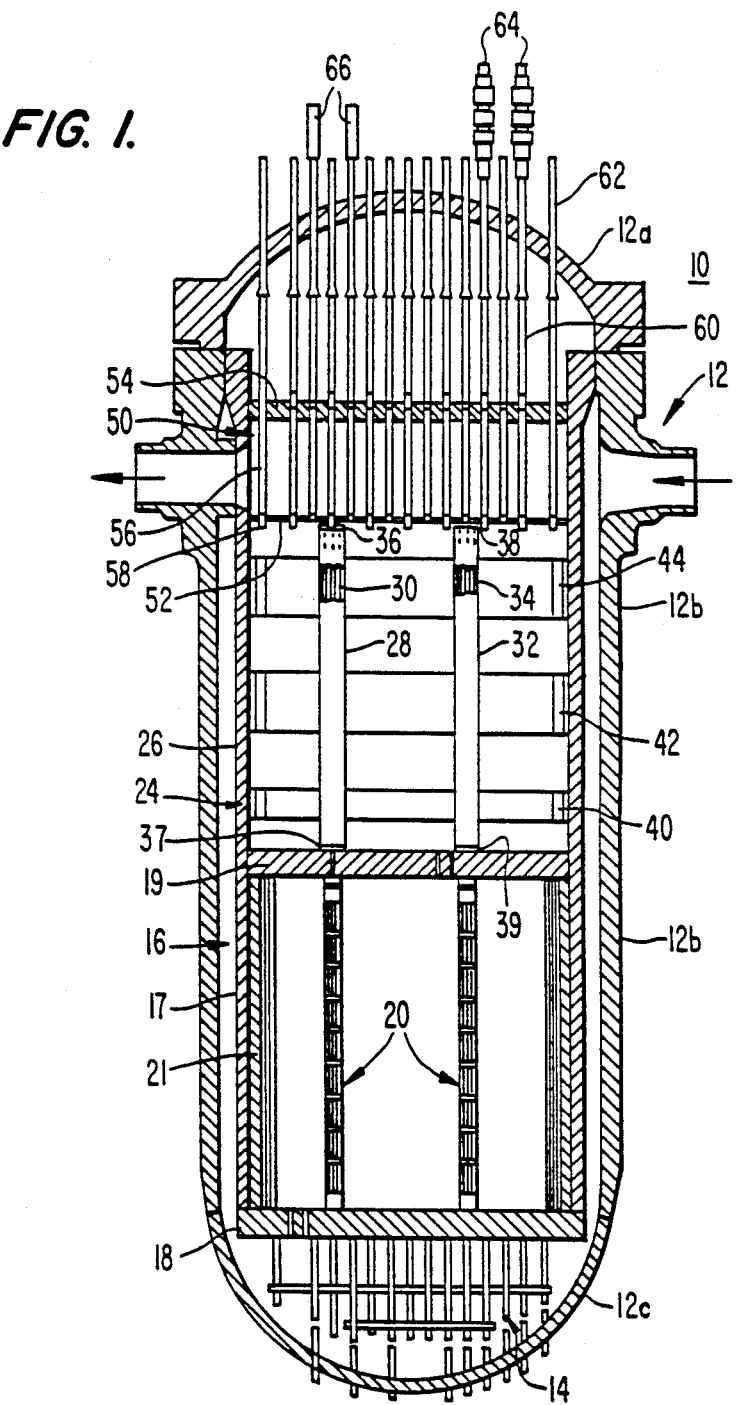
FIG. 1 is an elevational view, partially in cross-section, of a pressurized water reactor of a type with which the vibration arrestors of the present invention are intended to be employed.

FIG. 1 is an elevational view, partly in cross-section, of a pressurized water reactor 10 comprising a vessel 12 of generally conventional configuration including an upper dome 12a, cylindrical sidewalls 12b, and a bottom closure 12c comprising the base of the reactor 10. Within the bottom closure 12c, as schematically indicated, is so-called base-mounted instrumentation 14. The lower barrel assembly 16 comprises a generally cylindrical sidewall 17 affixed at its lower and upper ends to respective lower and upper core plates 18 and 19. Fuel rod assemblies 20 are positioned in generally vertically oriented, parallel axial relationship within the lower barrel assembly 16. A radiation reflection shield 21 is mounted interiorly of the cylindrical sidewalls 17, in conventional fashion.

The inner barrel assembly 24 includes a cylindrical sidewall 26 within which are positioned a plurality of rod guides in closely spaced, parallel axial relationship; for simplicity of illustration, only two such rod guides are shown in FIG. 1, namely rod guide 28 housing a cluster of radiation control rods 30 (RCC) and a rod guide 32 housing a cluster of water displacement rods 34 (WDRC). Mounting means 36 and 37 are provided at the respective upper and lower ends of the rod guide 28 and, correspondingly, mounting means 38 and 39 are provided at the respective upper and lower ends of the rod guide 32, the lower end mounting means 37 and 39 mounting the respective rod guides 28 and 32 to the upper core plate 19, and the upper mounting means 36 and 38 mounting the respective rod guides 28 and 32 to a calandria assembly 50.

The calandria assembly 50 includes a lower calandria plate 52, an upper calandria plate 54, and a plurality of parallel axial calandria tubes 56 which are positioned in alignment with corresponding apertures in the lower and upper calandria plates 52 and 54 and to which the calandria tubes 56 are mounted at their respective, opposite ends. Calandria extensions 58 project downwardly from the calandria tubes 56 and connect to corresponding mounting means 36 for the upper ends, or tops, of the RCC rod guides 28.

As will become apparent hereinafter, the calandria 50 performs significant support functions relative to the rod guides 28 and 32 of the inner barrel assembly 24, including providing a support for the vibration arrestors of the present invention, as hereinafter described. Whereas the vibration arrestors of the invention have numerous applications, they are disclosed initially herein in certain preferred embodiments, as employed in combination with the flexible rod guide support structure of the corresponding entitled application, hereinabove identified. More particularly, as disclosed therein, the upper end mounting means 38 associated with the WDRC rod guides 32 are interconnected by flexible linkages (shown and described in detail hereafter) to the mounting means 36 of the RCC rod guides 28. Thus, in this embodiment, the calandria extensions 58 are directly connected only to the upper end mounting means 36 for the RCC rod guides 28 and not to the upper end mounting means 38 for the WDRC rod guides 32—but serve, through the flexible linkages, to provide both stiff lateral support thereto, as well as resilient axial support thereto to compensate for relative differences in positioning of the tops of the WDRC rod guides 38, without overstressing the flexible linkages.

Extending upwardly beyond the upper calandria plate 54 and, more particularly, within the dome 12a of the vessel 12, there is provided a plurality of flow shrouds 60 respectively aligned with the calandria tubes 56. A corresponding plurality of head extensions 62 is aligned with the plurality of flow shrouds 60, with respective adjacent ends thereof in generally overlapping relationship. Control rod cluster (RCC) displacement mechanisms 64 and water displacement rod cluster (WDRC) displacement mechanisms 66 are associated with the respective head extensions 62, flow shrouds 60 and calandria tubes 56 which, in turn, are respectively associated with the respective clusters of radiation control rods 30 and water displacment rods 34. Particularly, the RCC and WDRC displacement mechanisms 64 and 66 connect through corresponding lines to the respective clusters of radiation control rods and water displacement rods 30 and 34, to control the respective vertical positions thereof and, particularly, to selectively lower same through corresponding openings (not shown) provided therefore in the upper core plate 19 into surrounding relationship with respectively associated fuel rod assemblies 20. In this regard, the clusters 30 and 34 have an extent of travel corresponding substantially to the longitudinal, or axial, height of the fuel rod assemblies 20. While the particular control function is not relevant to the present invention, insofar as the control over the reaction within the core is effected by the selective positioning of the respective rod clusters 30 and 34, it is believed that those skilled in the art will appreciate that moderation, or control, of the reaction is accomplished in accordance with the extent to which the control rod clusters 30 are inserted into the core and with the effective water displacement adjustment which is achieved by selective positioning of the water displacement rods 34.

Figure 2:
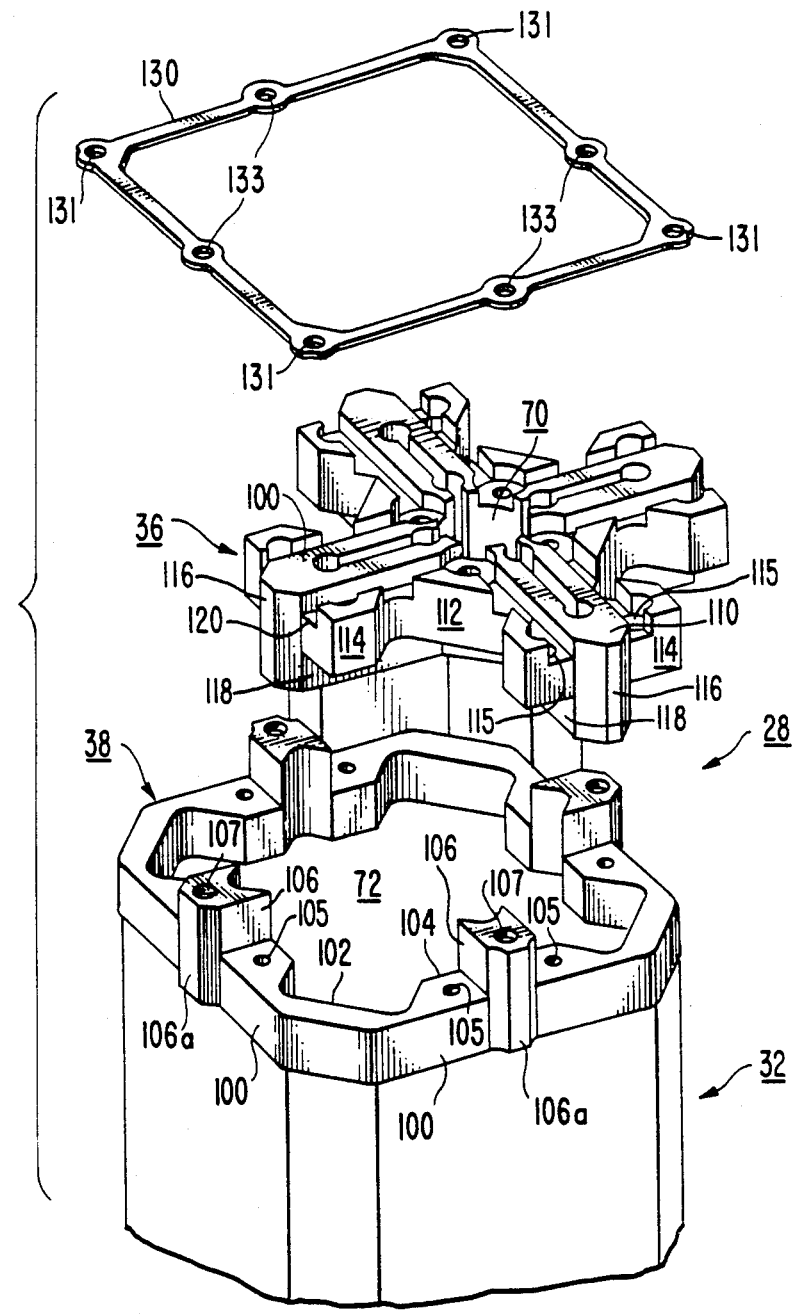
FIG. 2 is a perspective, exploded and partially broken-away, simplified view of RCC and WDRC top plates with associated guide structures and a flexible linkage for interconnecting same, in accordance with a first embodiment of the invention.
Figure 3:
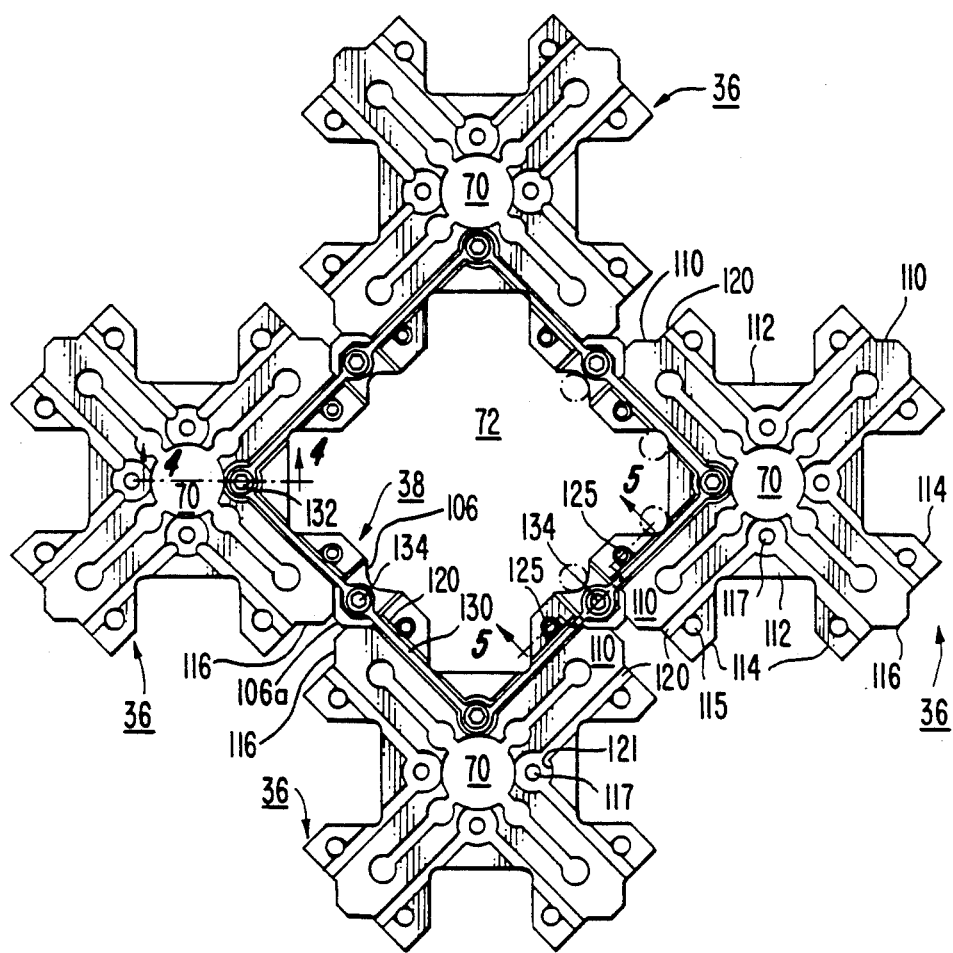
FIG. 3 is a top plan view of the elements of FIG. 2, as assembled.
Figure 4:
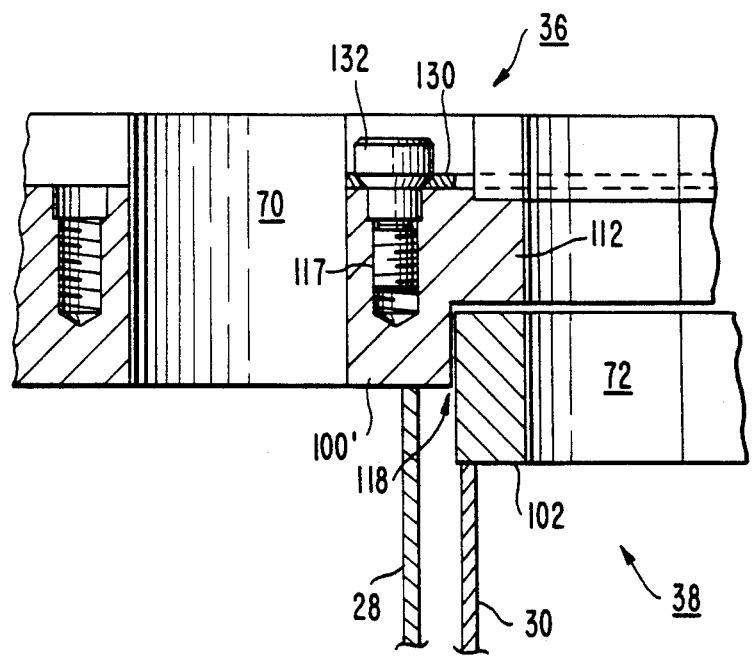
FIG. 4 is an elevational cross-sectional view taken along the line 4—4 in FIG. 3.
Figure 5:
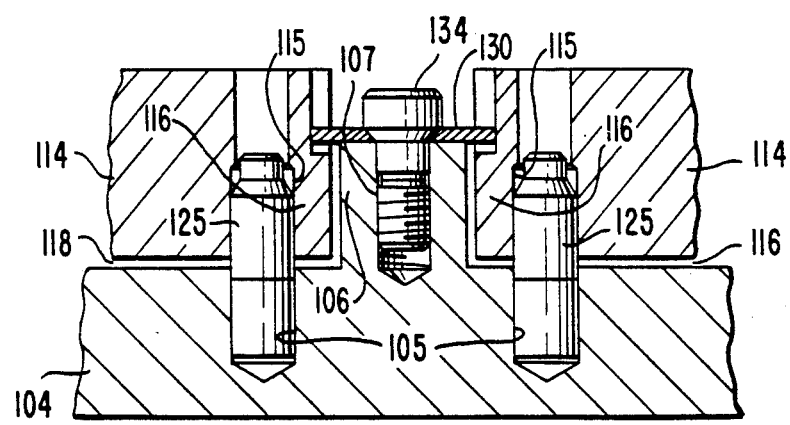
FIG. 5 is an elevational, cross-sectional view taken along the line 5—5 in FIG. 3.

FIG. 2 comprises a perspective, exploded and partially broken-away view of rod guides and respectively associated top plates, in conjunction with a flexible linkage in accordance with the aforesaid first embodiment of the present invention. FIG. 3 comprises a top plan view of an exemplary assemblage of a top plate of a first (WDRC) type, as interdigitized with associated top plates of a second (RCC) type disposed in surrounding, mating relationship therewith and, further, as interconnected by a flexible linkage. FIGS. 4 and FIG. 5 comprise elevational, cross-sectional views taken along the lines 4—4 and 5—5, respectively, in FIG. 3.

The rod guide 32 for the WDRC rod cluster 34 and the rod guide 28 for the RCC rod cluster 30, as best seen in FIG. 2, have first and second, different configurations, and have respectively associated therewith top plates 38 and 36 corresponding to the respective mounting means 38 and 36 diagramatically illustrated in FIG. 1. Each of the rod guides 28 and 30 is formed of sheet metal and each of the respective top plates 36 and 38 is machined to achieve the configurations as illustrated. The peripheries of the top plates 36 and 38 generally correspond to the peripheries of the respective rod guides 28 and 30, as viewed in cross-section taken in a plane transverse to the vertical axes thereof and thus parallel to the plane of FIG. 3. The top plates 36 and 38 furthermore have interior channels 70 and 72, respectively, the profiles or boundaries of which correspond to the configuration, again in cross-section, of the corresponding RCC rod clusters 30 and WDRC rod clusters 34, the latter being illustrated in simplified schematic form in FIGS. 6 and 7, respectively.

Figure 6:
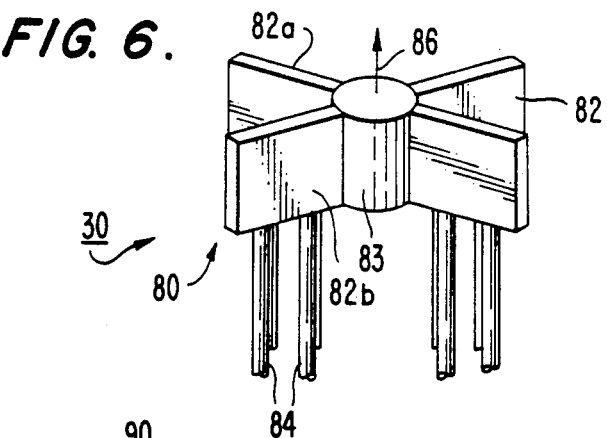
FIG. 6 is a simplified, perpective view of an RCC rod cluster and associated supporting spider and drive line.

In FIG. 6, the RCC rod cluster 80, shown in a simplified perspective view, includes a spider 82 comprising a pair of orthogonally related cross arms 82a and 82b interconnected by a central hub 83, a plurality of RCC rodlets or rods 84 depending from the arms 82a and 82b. Particularly, each of the arms 82a and 82b carries four (4) such rods 84. Correspondingly, as best seen in FIG. 3, the interior channel 70 of the top plate 36 has a profile corresponding to the RCC rod cluster 30, permitting the latter to be lowered axially through the channel 70 thereof under control of the control rod displacement mechanism 64 (FIG. 1) which connects through drive line 86 to the central hub 83 of spider 82 of the RCC rod cluster 30.

Figure 7:
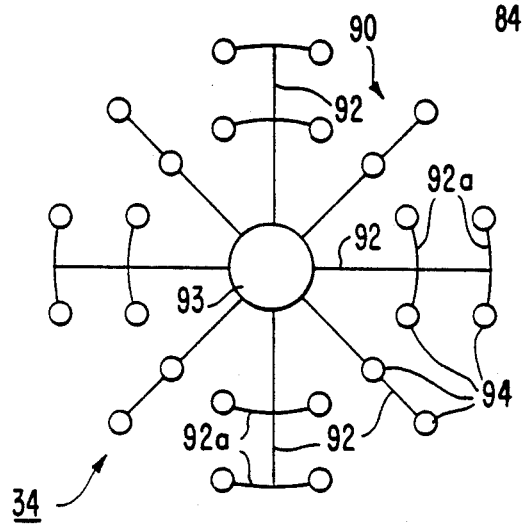
FIG. 7 is a simplified, plan view of a WDRC rod cluster and associated spider.

The interior channel 72 of the WDRC top plate 38 likewise has a profile corresponding to the periphery, again in cross-section, of the WDRC rod cluster 34 (FIG. 1), the latter being shown in a simplified schematic plan view in FIG. 7. The WDRC rod cluster 34 similarly includes a spider 90 having a plurality of radially extending arms 92 connected to a central hub 93; further, alternate ones of the arms 92 include transverse cross arms 92a. A plurality of WDRC rods 94 then are appropriately connected to the arms 92 and 92a and depend therefrom in parallel axial relationship.

From FIG. 3, it will be apparent that the respective rod guides 28 and 30 and the associated top plates 36 and 38 are configured so as to permit relatively dense packaging thereof and, more particularly, the assemblage thereof as interdigitized matrices. Particularly, the top plate 38 of the WDRC rod guides 30 is surrounded by a symmetrical, associated sub-array of four RCC top plates 36; further, each of the RCC top plates 36 in turn is configured to engage an associated sub-array of four WDRC top plates 38. While the symmetrical configuration of the respective rod clusters and thus of the corresponding rod guides and associated top plates is a preferred embodiment, alternative configurations are also contemplated as within the scope of the invention, the principal requirement being that interdigitized matrices of the respective rod guides and top plates may be established in a tightly packaged array. The top plates 36 and 38 are now described in detail, with concurrent reference to FIGS. 2-5, common reference numerals being employed to identify the common elements of the symmetrical portions of the respective, individual structures.

The WDRC top 38 plate is of a generally annular configuration with a generally square periphery and includes four (4) major arms 100, each each pair of two (2) adjacent arms 100 extending in perpendicular relationship and the totality of four (4) such pairs defining four (4) major exterior vertices, or corners. A diagonal minor arm 102 spans each such vertex and integrally interconnects the pair of associated, adjacent major arms 100. Inwardly transverse, or lateral, extensions 104 are formed at intermediate positions along the length of each of the major arms 100 displaced from the opposite ends thereof, and integrally join a central, link connection vertical stub 106. An outwardly transverse, or lateral wedge-fit extension 106a is formed on the stub 106, extending beyond the outer sidewall surface, or periphery, of the major arm 100. A link connection threaded bore 107 is formed in each vertical stub 106.

The RCC top plate 36 (best seen in FIG. 3) includes a corresponding plurality of four (4) equiangularly displaced major arms 110, the interior peripheral edges of each pair of adjacent arms 110 defining an interior vertex which receives therein a corresponding exterior vertex, or corner, of the top plate 38, as defined by a pair of adjacent major arms 100 thereof. The top plate 36 further includes a diagonal minor arm 112 extending across the geometrical interior vertex defined by the major arms 110, the exterior vertical surface of the arm 112 corresponding to the interior vertical surface of the diagonal minor arm 102 of the top plate 38. Transverse, or lateral extensions 114 extend symmetrically from both sides of the major arms 110, each extension 114 corresponding in size and configuration to the corresponding lateral extension 104 of a top plate 38 associated with the corresponding arm 100. As best seen in FIG. 2, the transverse lateral extensions 114 on the respective peripheral edges of a pair of adjacent major arms 110 which define a given interior vertex are continuous with the diagonal minor arm 112, and furthermore the extensions 114 and the included diagonal minor arm 112 have a common planar upper surface, corresponding to the planar upper surface of the major arms 110, but are forshortened in vertical height relative to that of the major arms 110 such that the lower surfaces thereof define an undercut interior peripheral region, or channel, 118.

The outer end of each major arm 110 furthermore includes a wedge-fit extension 116 generally aligned with the major axis of the corresponding major arm 110. A stop pin bore 115 is formed in each of the transverse lateral extensions 114 of each arm 110 in a position so as to be aligned with the stop pin bore 105 in the corresponding inward lateral extension 104 of a corresponding arm 100 when the top plates 36 and 38 are assembled, as in FIG. 3. Further, a link connection threaded bore 117 is formed in the integral juncture 110' of adjacent major arms 110 surrounding the interior channel 70 and defining the interior vertex. A groove 120 further is formed in the associated transverse extensions 114 and the included diagonal minor arm 112, extending along the respectively associated peripheral edges of the associated pair of adjacent major arms 110 and communicating with a counter bore 121 which is coaxial with the threaded bore 117.

The assembled relationship of the top plates 36 and 38 is best understood from the top plan view of FIG. 3, taken in conjunction with the vertical cross-sectional views of FIGS. 4 and 5, the latter taken along the lines 4—4 and 5—5 in FIG. 3, respectively. As seen in FIG. 4, each diagonal minor arm 102 of the top plate 38 is received within the corresponding diagonal portion of the channel 118 defined by the diagonal minor arm 112 and the integral juncture 110' of an adjacent pair of major arms 110, the diagonal minor arm 112 thus being superposed on diagonal minor arm 102. As seen in FIG. 5, the transverse lateral extensions 114 are superposed on the respective midside, inward lateral extensions 104 of a given major arm 100 of the top plate 38. As best seen from FIG. 3, the free ends of the major arms 110 of two adjacent top plates 36 which bound, or are contiguous with, a common major arm 100 of a top plate 38 are juxtaposed in closely spaced relationship, the respective, aligned wedgefit extensions 116 thereof closely engaging the respective surfaces of the corresponding outward, transverse wedge-fit extension 106a of that associated major arm 100. Stop pins 125 then are positioned in the aligned stop pin bores 105 and 115.

Finally, a flexible linkage 130 is received within the channels 120 of the group of top plates surrounding a given top plate 38, which then is bolted in position. Particularly, bolts 132 are received through the apertures 131 in the corners, or vertices, of the linkage 130 and securely threaded into the corresponding, threaded bores 117 and, further, bolts 134 are received through the apertures 133 in the side arms of the linkage 130 and securely threaded into the corresponding threaded bores 107 in the link connector vertical stubs 106.

Respective matrices of top plates 36 and 38 thus are interdigitized by virtue of the respective structural components defining the mating, interior and exterior vertices thereof and including the channels 118 and the superposed lateral, or transverse, extensions 114 and 104. Further, the top plates are laterally interlocked (i.e., in a plane perpendicular to the axis of the assembly 24) by the flexible linkages 130 in a two dimensional, concatenated relationship in which each of the top plates 38 is linked rigidly in the lateral direction to four respectively surrounding top plates 36—and, in turn, each of the top plates 36 is laterally interlocked at its four interior vertices to associated exterior vertices of four top plates 38 which are interdigitized therewith. It will be appreciated that whereas the interdigitized relationship exists throughout the majority of the array, as is apparent, the outer edges, or the periphery, of the array necessarily will be defined by one or more peripheral edges of either one or the other of the top plates 36 and 38—typically, the top plates 36.

Figure 8:
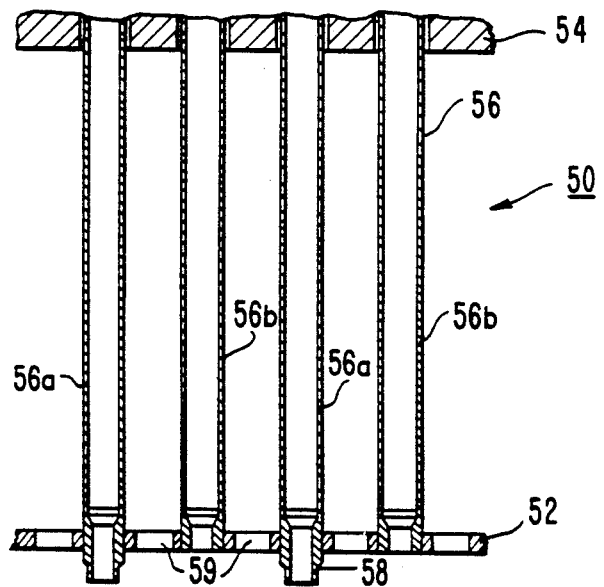
FIG. 8 is an elevational, cross-sectional view of a portion of the calandria plate and associated calandria extensions as seen in FIG. 1, on an enlarged scale.

Mounting of the concatenated and interdigitized matrices of top plates 36 and 38, for securing the top ends of the rod guides 28 and 30 in position within the upper end of the inner barrel assembly 24, is achieved by connections provided between the lower calandria plate 52 and the RCC top plates 36. FIG. 8 is an enlarged view of the portion of a lower calandria plate 52 and of a broken-away portion of the upper calandria plate 54, illustrating more clearly the association of the calandria tubes 56 and the calandria plates 52 and 54. More specifically, the calandria tubes 56a which are connected at their lower ends to corresponding calandria extensions 58 are associated with the RCC rod clusters and the associated top plates 36. Calandria tubes 56b on the other hand, are associated with the WDRC rod clusters and the corresponding top plates 38. Provided in the lower calandria plates 52, intermediate the various calandria tubes 56, are flow holes 59 through which the core output flow, exiting upwardly from the inner barrel assembly 24, proceeds through the calandria assembly 50. Corresponding flow holes (not shown) ar provided in the upper calandria plate 54.

Figure 9:
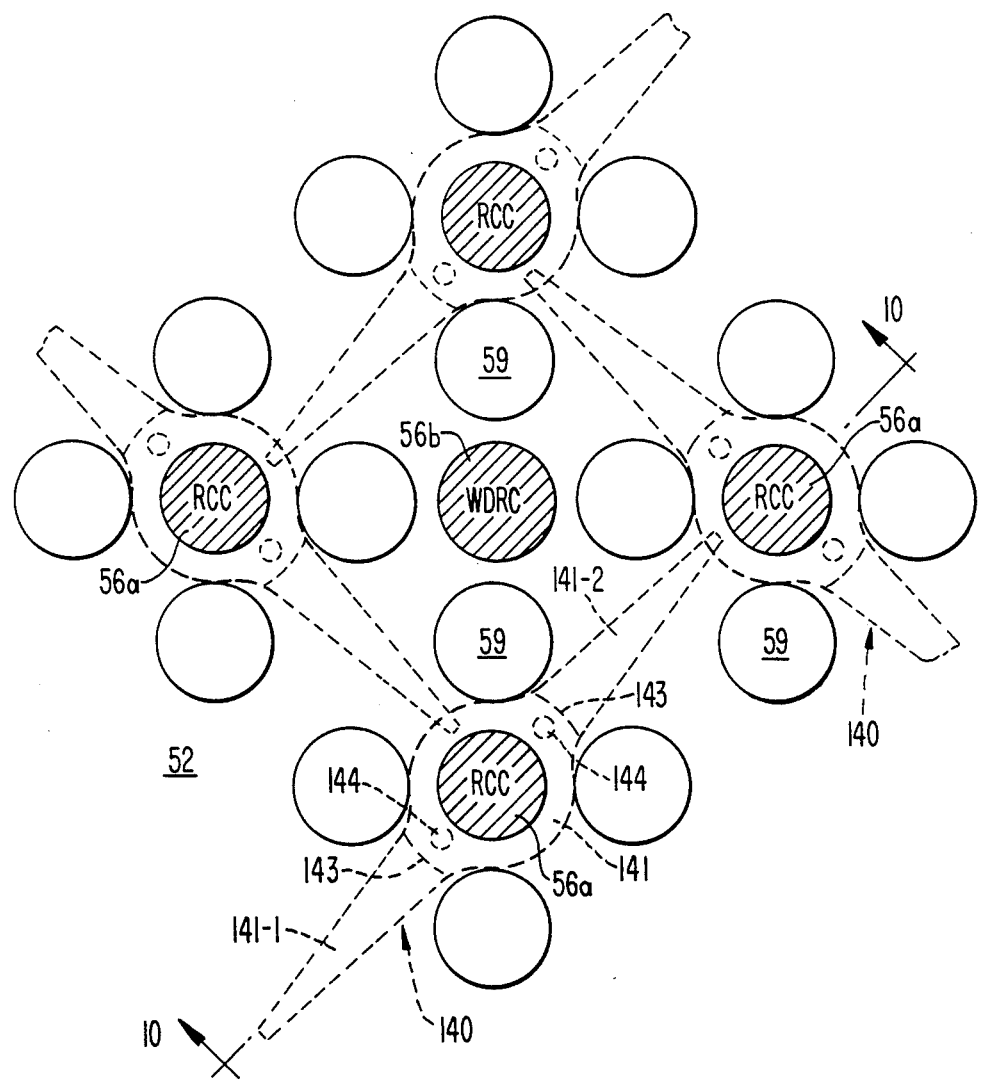
FIG. 9 is a schematic, top plan view of a portion of the lower calandria plate of FIG. 1, illustrating the relationship of RCC and WDRC rod guides and, in hidden lines, the vibration arrestors of the present invention and their relative orientations as assembled with the rod guides.
Figure 10:
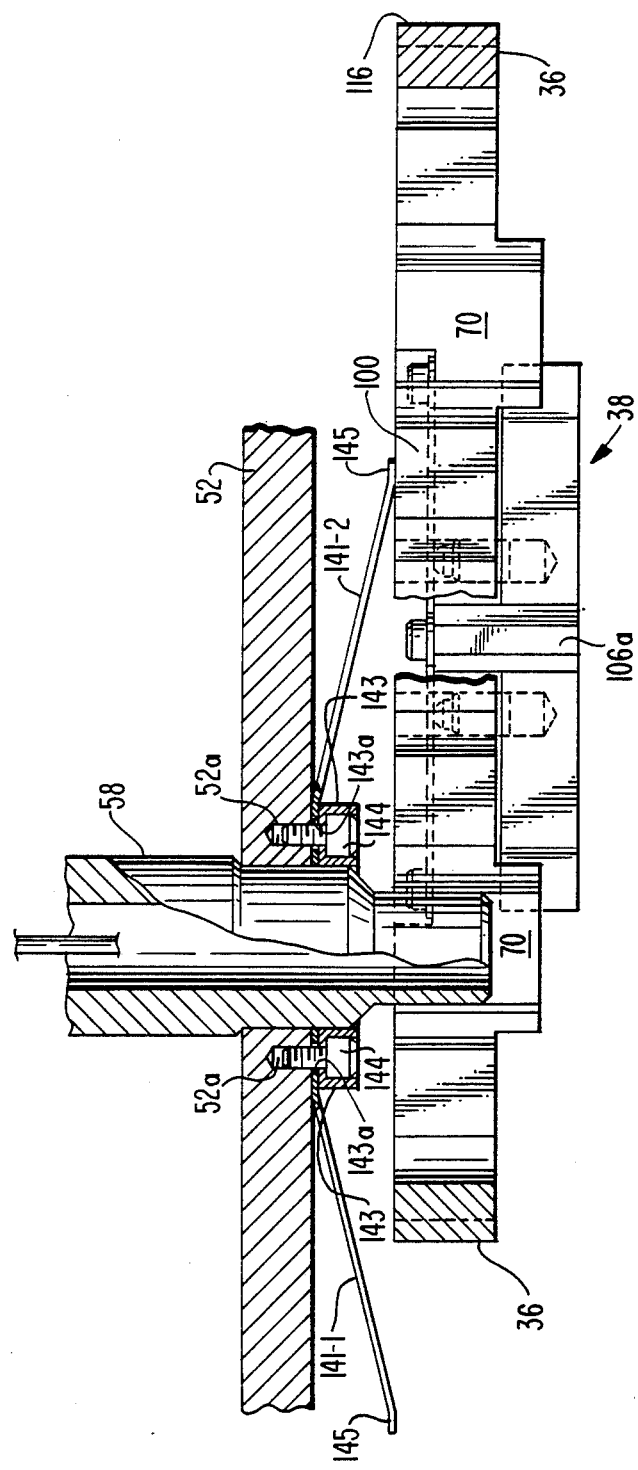
FIG. 10 is an elevational, cross-sectional view taken generally along the line 10—10 in FIG. 9, illustrating the association of the assembled RCC and WDRC top plates with the calandria extensions and the engagement therewith of vibration arrestors in accordance with the present invention.
Figure 11:
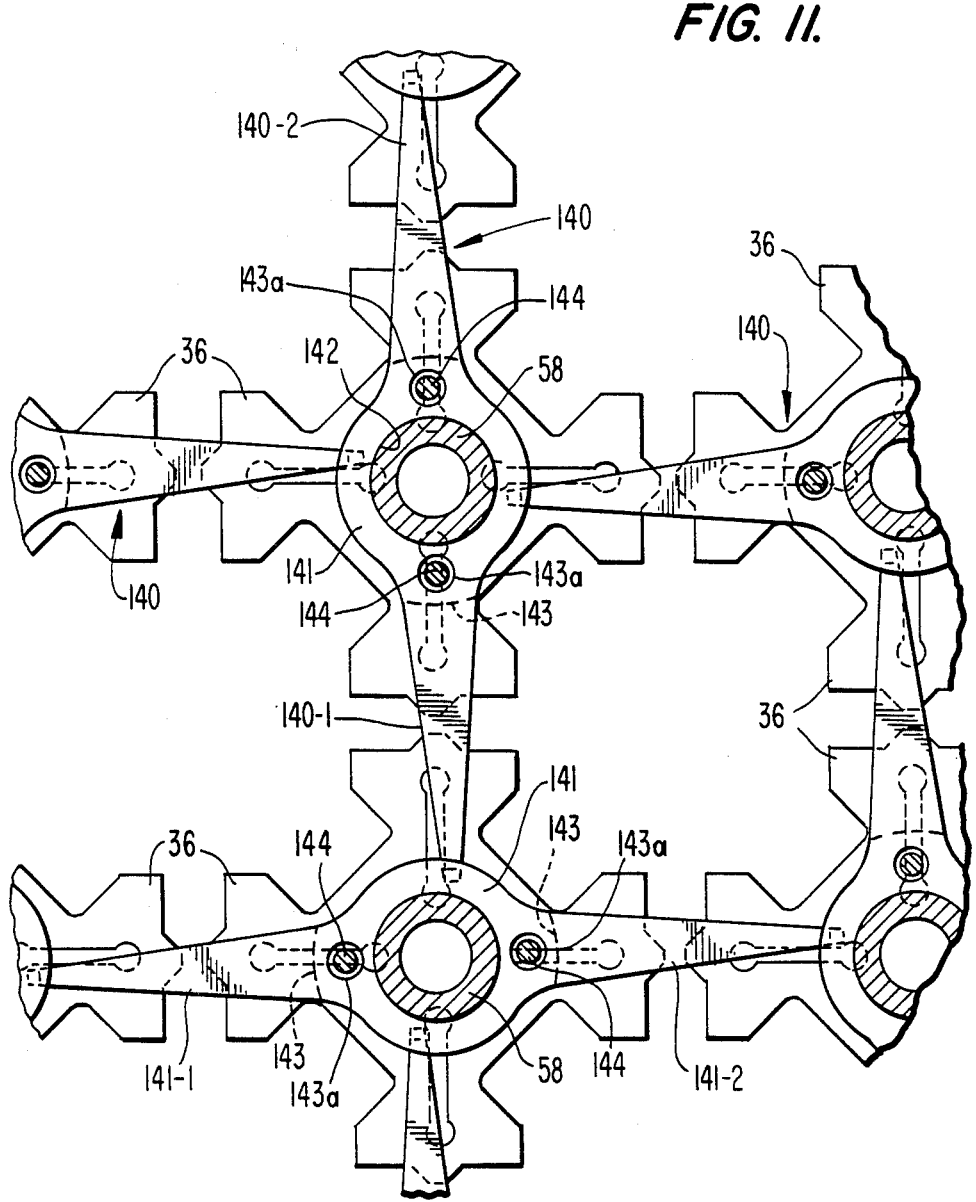
FIG. 11 is a simplified, plan view, taken along a plane coincident with the lower surface of the calandria lower plate and viewed axially downwardly, as in FIG. 1, of the assemblage of vibration arrestors in accordance with a first embodiment of the invention and an array of RCC top plates, an interleaved array of WDRC top plates being omitted for clarity and simplification of the illustration.

FIGS. 9, 10 and 11, discussed concurrently, illustrate a first embodiment of a vibration arrestor 140 in accordance with the present invention. More particularly, FIG. 9 is a schematic, top plan view of a portion of the lower calandria plate 52, illustrating (in solid cross-section) the assemblage of calandria tubes 56a and 56b associated with the array of RCC and WDRC top plates 36 and 38, respectively shown in FIG. 3. The vibration arrestors 140 are shown in dotted line form since disposed beneath the calandria plate 52 and thus hidden from direct view in FIG. 9. FIG. 10 is a cross-sectional view illustrating the connection of a top plate 36 to the calandria bottom plate 52 by a calandria extension 58. Particularly, the calandria extension 58, of circular cross-section, is received within the corresponding circular cross-sectional channel 70 of an RCC top plate 36, thus establishing lateral stability of the RCC top plate 36; each top plate 36 receives a corresponding calandria extension 58 in its channel 70. Accordingly, the RCC top plates 36 are supported directly, and the interdigitized and concatenated WDRC top plates 38 thus are supported through the RCC top plates 36, against lateral movement by the plurality of calandria extensions 58 and ultimately by the lower calandria plate 52. FIG. 11 is a plan view taken along a plane substantially coinciding with the lower surface of the lower calandria plate 52 and thus passing through the calandria extensions 58 which appear in cross-section therefore in FIG. 11; in FIG. 11, for clarity of presentation, the associated RCC top plates 36 are shown in simplified, or schematic outline form and the WDRC top plates 38 are omitted.

With concurrent reference to FIGS. 9, 10 and 11, each vibration arrestor 140 comprises a central hub 141 having a central aperture 142 therein by which it is received over a calandria extension 58 and a pair of integral springs arms 141-1 and 141-2 extending generally radially from the hub 141 in oppositely oriented, aligned relationship, and thus at a 180° relative angular displacement about the hub 141 and aligned with a diameter therethrough. The hub 141 thus functions as a mounting base of the arrestor 140. As best seen in the cross-sectional view of FIG. 10, and as appear partially in hidden lines in FIGS. 9 and 11, an annular clamping, or stiffening, ring 143 is received over the central hub 141, the ring 143 including a pair of apertures 143$a$ which are positioned in alignment with a corresponding pair of apertures 141$a$ in the hub 141 for receiving bolts 144 which are engaged in threaded bores 52$a$ in the calandria plate 52. As best seen from the plan views of FIGS. 9 and 11, the stiffening rings 143, while of generally annular configuration, have a periphery generally corresponding to that of the hub 141 of the arrestor 140, and thus include lateral extensions 143$b$ corresponding to the portions of the hub 140 which are aligned with the spring arms 141-1 and 141-2. The aligned apertures 141$a$ and 143$a$ for receiving the bolts 144 correspondingly are formed in these mating portions of the hub 141 and lateral extension 143$b$ of the ring 153. As also best seen in FIGS. 9 and 11, the spring arms 141-1 and 141-2 are of sufficient length so as to engage the surfaces of the top plates 36, which are aligned with and next adjacent to a given top plate 36 and associated extension 58 on which a given arrestor 140 is mounted, at positions closely adjacent the junction 100' of the major arms 100 of those adjacent top plates 36, and thus in the vicinity of their respective central apertures 70.

With respect to the matrix of RCC top plates 36 and the corresponding RCC calandria tubes 56$a$, the vibration arrestors 140 are rotated by 90° for successive RCC calandria tubes 56$a$ of a given row, the vibration arrestors 140 for the respective, column-related calandria tubes 56$a$ of successive, adjacent parallel rows being offset by 90°. Further, due to the symmetrical and regular array of calandria tubes 56 and associated extensions 58 with respect to the top plate 36, and the alternating parallel and transverse orientation of the vibration arrestors 140, it will be apparent that each top plate 36 is engaged by a symmetrically loaded force by corresponding spring arms 141-1 and 141-2 of the arrestors 140 associated with the commonly oriented, respectively next adjacent extensions 58, so as to maintain a symmetrical or balanced loading force thereon. The arrestors 140 thus resiliently load the top surfaces of the top plates 36 of the RCC rod guides 28 and generate suffucient lateral, frictional force such that fluctuating steady state loads applied to the guides do not cause slippage; the vibration arrestors 140 also compensate for effects of differential thermal expansion and minimize adverse effects of resulting forces due to such thermal expansion.

Figure 12:
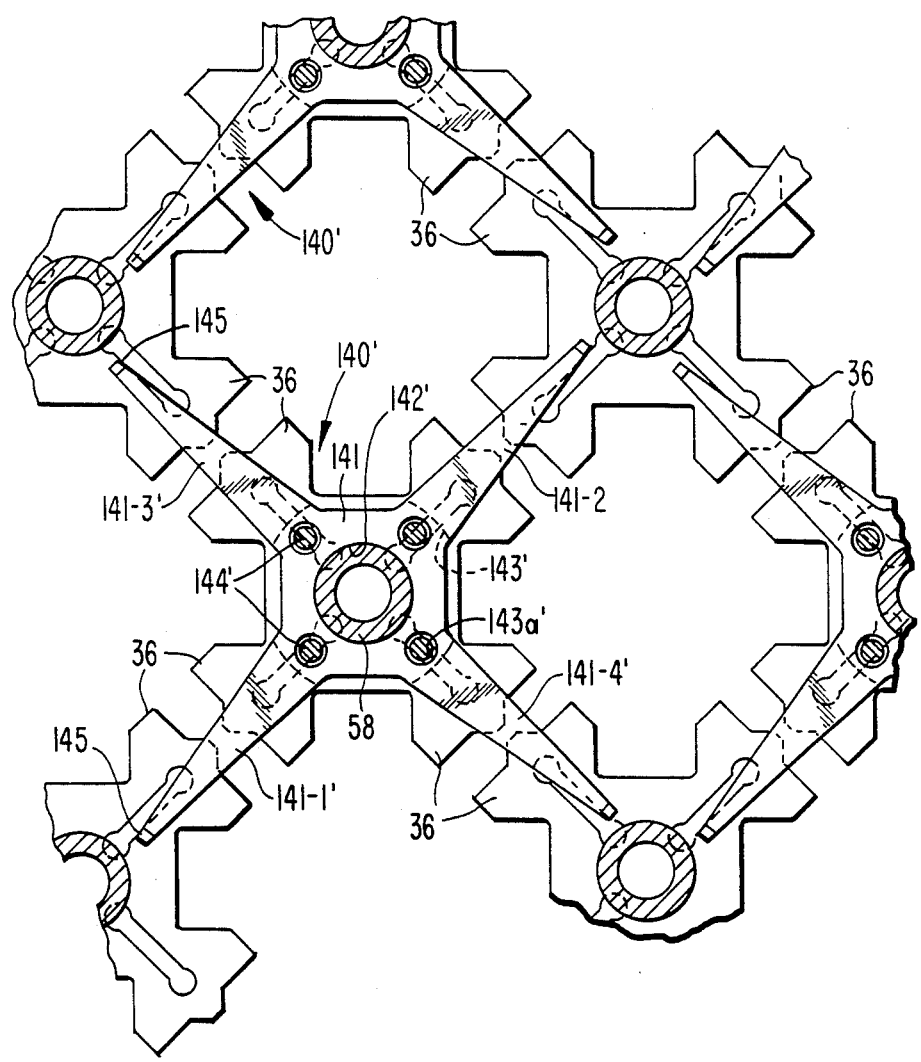
FIG. 12 is a simplified plan view, corresponding to that of FIG. 11, incorporating vibration arrestors in accordance with a second embodiment of the present invention.

The configuration of the vibration arrestors 140 of FIGS. 9–11 affords maximum flexibility of installation, accommodating as well the discontinued pattern of the top plates 36 and 38 which necessarily occurs at the periphery of the interleaved arrays thereof. An alternative configuration of the invention, comprising the vibration arrestor 140' shown in FIG. 12, offers the advantage of a further reduction in the total number of parts required, and particularly, the number of vibration arrestors including associated stiffening rings, and is suitable for installation within the regular, repeating pattern of the array and thus with top plates displaced from the array periphery. More particularly, as shown in FIG. 12, of the vibration arrestors 140' comprise multiple spring arms and specifically, for the array configuration illustrated, quadrature related spring arms 141-1', 141-2', 141-3' and 141-4'. The corresponding stiffening ring 143' is again of generally annular configuration and, as with the first embodiment, has an outer periphery corresponding to that of the hub 141' and thus includes lateral extensions 143$b$' mating the portions of the hub 141' aligned with the respective spring arms 141-1' through 141-4'; likewise, apertures 143$a$' are provided in the lateral extensions 143$b$', and aligned with the apertures 141$a$' in the hub 141' for receiving corresponding bolts 144' for connecting the arrestor 140' to the lower calandria plate 52. As is apparent from FIG. 12, the vibration arrestors 140' are mounted on calandria extensions 58 of alternate rows and the respective spring arms 141-1' to 141-4' thereof engage the top plates 36 of the intermediate rows. It follows that the top plates 36 of the alternate rows of calandria extensions 58 on which the arrestors 140' are mounted do not have spring arms engaged thereon. However, as compared with the array installation of spring arms 140 in FIG. 11 in which all top plates 36 receive two symmetrically disposed spring arms thereon, four spring arms engage each of the top plates 36 of the intermediate, alternating rows thereof in the array configuration of FIG. 12. Significantly, in this embodiment, the WDRC top plates 38 (not shown in FIG. 12) are interengaged and flexibly linked with the RCC top plates 36 of the intermediate, alternate rows which are engaged by spring arms of the arrestors 140' and through their respectively associated flexible linkages 130 (see, e.g., FIGS. 2–5) serve to transmit substantially equal, resilient biasing forces to the RCC top plates 36 of the alternate rows associated with the calandria extensions 58 on which vibration arrestors 140' are disposed. Thus, by the linking together of the successive rows of top plates 36 afforded by the flexible linkages 130, a substantially equal resilient biasing force is applied to each of the top plates 36 of the array, that force corresponding substantially to the compressive force applied to each of the top plates 36 in the array of FIG. 11. Thus, the arrestors 140' of the second embodiment provide both the same effective resilient biasing force and frictional force opposing lateral displacement of the individual top plates 36, in both embodiments.

Figure 13:
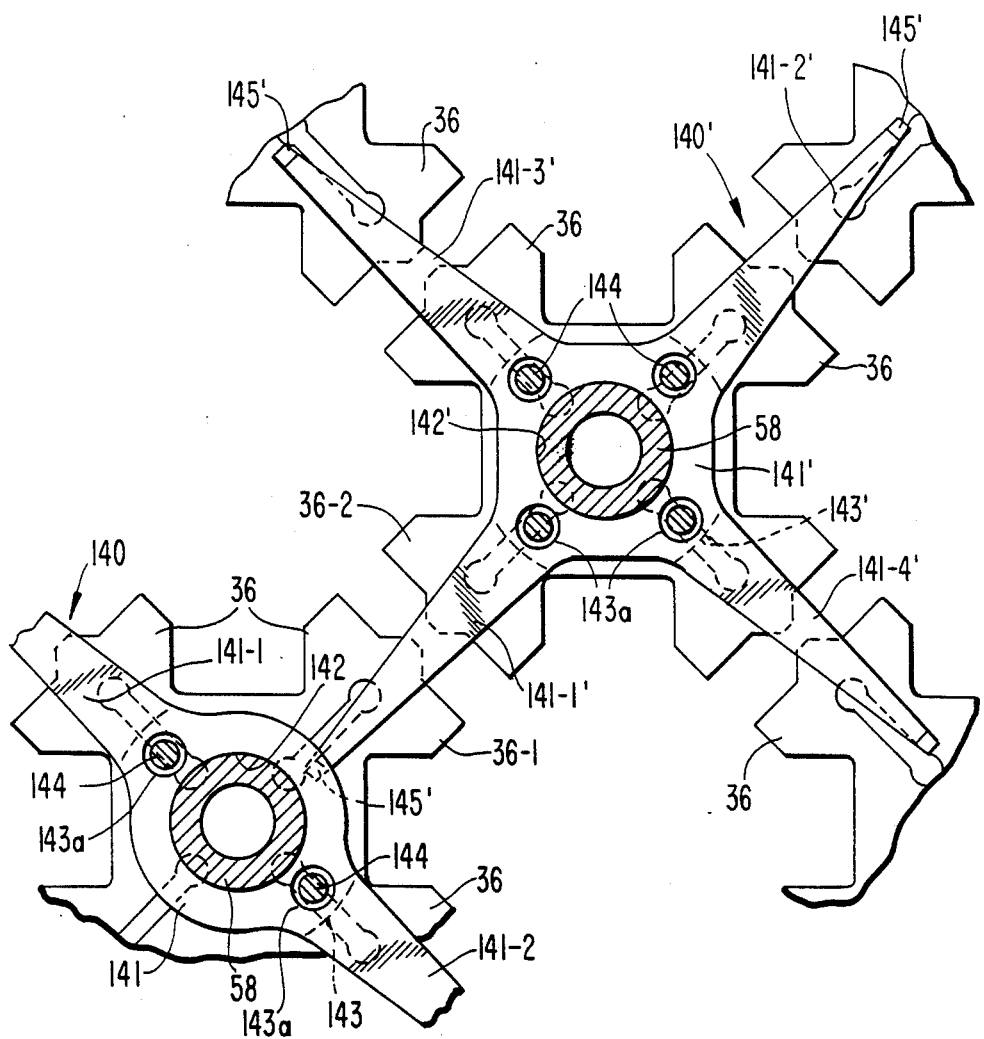
FIG. 13 is a simplified plan view, corresponding to that of FIG. 11, illustrating the use, in combination, of vibration arrestors of the first and second embodiments of the invention, as may be employed in a practical installation.

The plan view of FIG. 13 illustrates, on an enlarged scale, the combined use of an arrestor 140' of the second embodiment with an arrestor 140 of the first embodiment, as may be employed at the periphery of the interleaved arrays of top plates 36 and 38, at which periphery the repeating pattern necessarily is disrupted. In this instance, the RCC top plate 36-1 is presumed to be at the periphery of the array whereas the RCC top plate 36-2 is within the interior of the array and thus displaced from the boundary at which the repeating pattern is disrupted. Thus, it will be appreciated that the invention contemplates the combined use of the two embodiments of the arrestors 140 and 140', where appropriate.

FIG. 13 also renders clear that the second embodiment arrestor 140', with respect to either of the associated pairs of spring arms 141-1' and 141-2', and 141-3' and 141-4', is the structural equivalent of the arrestor 140 having only a single pair of spring arms 141-1 and 141-2. Due to the enlarged scale of the drawing of FIG. 13, reference is had thereto for a more specific description of details of the arrestors 140 and 140', with particular reference to the latter and taking into account the direct equivalence of the structures, as aforestated.

Specifically, the arrestors are formed of a uniform thickness of metal, of 0.33". The spring arms are approximately 8.00" in length, as measured from the boundary of the underlying stiffening ring 143 (143') and taper from a width along that boundary of approximately 2.125" to a width at the tip, or end portion 145 of approximately 0.50". Moreover, the tip 145 extends approximately 0.50" beyond the length of the 8.00" major portion of the arm, and is bent so as to lie flat on the engaging surface of the associated RCC top plate 36, as seen for example in FIG. 10. The minimum outer diameter of the annular stiffening ring 143 (143') is approximately 5.75" and the central aperture 143a therein is approximately 3.75", yielding a minimum annular dimension of 1.00"; the maximum diameter of the arcuate section (i.e., as measured from the center to the hidden line) of the stiffening ring 143 (143') is approximately 7.00". The rings 143 (143') are formed of metal, and are of a uniform thickness of approximately 1.00". The bolts 144 (144') are of 0.750" diameter and are disposed on centers at a radius of 2.75". The spring arms depend angularly from the bottom surface of the lower calandria plate 52 so as to span the approximately 2.00" spacing to the surface of the support plates 36 engaged thereby. Each spring arm is designed to undergo deflection at the tip 145 in a range from an approximate minimum of 0.62" to an approximate maximum of 0.89" in a vertical direction parallel to the axis of the vessel, and exerts a deflection force of a corresponding value in a range of from 500 lbs. to 725 lbs., taking into account the extent of deflection.

For these practical operating conditions, suitable materials for fabrication of the vibration arrestors 140 and 140' include INCONEL 718 (TM) and stainless steel 403. If used in a less hostile environment than a nuclear reactor pressure vessel, and/or if less deflection capability is required, the arrestors may be of a similar geometry but employ different materials.

The vibration arrestors 140 and 140' of the present invention, while requiring separate and special fabrication, relative to the aforementioned leaf springs, are nevertheless of simple construction which facilitates ease and low cost of manufacture, and affords a significant simplification in their installation, relative to the use of the leaf springs.

Significantly, the vibration arrestors 140 and 140' have symmetrical configurations and thus, as mounted on the calandria extensions 58, are fully supported laterally thereby and thus eliminate the requirement that the mounting bolts 144 react lateral loads. Particularly, the symmetry of the vibration arrestors prevents bending forces from being applied to the bolts 144, because the compression load applied to the tips, or ends 145 of the spring arms 141-1 through 141-4 are the same, and thus no net external moment is applied. Effectively, once compression of the spring arms is established, upon installation and assembly of the calandria with the associated rod guides, the bolts 144 effectively are no longer required to support the associated vibration arrestors 140, 140'. By virtue of the configuration, compression generates only an internal moment in the hubs 141, 141' of the vibration arrestors 140, 140' which, since made of high strength material, can withstand the stress. Further, the provision of the stiffening rings 143, 143' is significant in that the latter provide a bearing surface for the attachment bolts 144 and prevents the creation of localized stresses in the central hubs 141, 141' of the arrestors 140, 140', due to bolt preload. The rings 143, 143', while reinforcing the hubs 141, 141', produce only tensile loads on the bolts 144, which is a desirable and acceptable condition.

The significant reduction in parts relative to the use of leaf springs is a feature shared by both embodiments of the present invention, the total number of parts required for the single pair-spring arm configuration of the arrestor 140 being 392 and for the quadrature-or two pair-spring arm configuration of the arrestor 140' being only 276, as compared to a total number of parts in excess of 2,000 for the leaf spring installations.

Accordingly, whereas the vibration arrestors of the present invention have wide ranges of application, as an alternative to leaf spring or other resilient structures employed under compression, their use is particularly advantageous in conjunction with the flexible rod guide support structure of the above referenced copending application. The requirements which must be satisfied by these structures, and the manner in which the flexible rod guide support structure incorporating the vibration arrestors of the present invention accommodates these conditions and satisfies those requirements, as now may be better appreciated, will be discussed, again with reference to FIG. 1.

As before noted, the support structure itself, must not introduce sources of vibration and most significantly must not be susceptible to excessive wear which, over time, would cause the mounting assembly to loosen and eventually permit vibrations to ensue. These criteria are satisfied by the concatenated and interdigitized matrices of the RCC top plates 36 and WDRC top plates 38, which effectively present a single, relatively stiff structure of mutually, or interdependently, supported top plates at the interface of the inner barrel assembly 24 and the lower calandria plate 52, which structure nevertheless permits a limited extent of relative motion between the rod guides 28 and 32 by out-of-plane bending of the flexible linkages 130. The flexible support structure furthermore facilitates assembling the rod guides with the calandria extensions 58—which assembly, as before noted, is accomplished by having the RCC top plates 36 receive the calandria extensions 58 within the respective cylindrical internal channels 70 therein. The extent of relative movement between adjacent top plates 36 and 38, as permitted by inplane tensile elongation of the flexible linkages 130, however, is limited by the stop pins 125 which provide an ultimate load capacity for very large loads. Thus, under very large loads, the stop pins 125 prevent excessive loading of any of the flexible linkages 130 and ensure that loads from the WDRC rod guides 30 are transmitted through the concatenated and interdigitized RCC top plates 36 into the calandria bottom plate 52. The stop pins 25 serve a further function in providing rough positioning of the interdigitized top plates 36 and 38 prior to attachment thereto of the flexible linkages 130.

As previously noted, the vibration arrestors 140 and 140' serve to react normal operational fluctuating loads laterally, by the frictional forces generated by their engagement with the top surfaces of the RCC top plates 36. As employed in accordance with the present disclosure, the vibration arrestors 140 (140') may be designed to react nominally a force of 368 lbs. at each RCC guide top plate 36, assuming a coefficient of 0.3 without slippage. More specifically, the nominal force applied to each RCC top plate 36 is with a range of 1000 lbs. to 1,400 lbs. for the two spring arm configuration of the arrestor 140, and double that for the four spring arm configuration of the arrestor 140' for each RCC top plate 36 engaged thereby. The four spring arm configuration effectively applies the same normal force to the tops of all of the RCC top plates 36, in view of the interlinkage of the alternate rows of RCC top plates 36 which are not engaged by vibration arrestors 140', with the intermediate alternate rows of top plates 36 on which four spring arms are engaged. Differential lateral forces across the array thus may be compensated for and reacted to independently by the corresponding vibration arrestors 140 (140'), of both embodiments.

The concatenated design of the interleaved and flexibly linked top plates 36 and 38 particularly precludes impact wear from occurring between the rod guide top plates 36 and 38 and the calandria extensions 58. To the extent that such wear does occur, and particularly relative to the calandria extensions 58, the extent and effect of such wear is believed not significant relative to rod guide alignment or the structural capability of the extensions 58 to react to seismic loads. To the extent that wear relative to a particular extension 58 occurs, in like fashion, the vibration arrestors 140 (140') will continue to maintain both axial and lateral alignment, and to react forces tending to cause lateral displacement, thus limiting the excitation and ultimately wear on the RCC guides 34 and WDRC guides 30 and the respective rodlet clusters 92 and 84.

The concatenated relationship of the interdigitized matrices of the array affords the further significant benefit of distributing force effects via the flexible linkages and compensating for differential axial expansion and lateral forces acting on the array, throughout the entirety of the interdigitized rod guide top plates 36 and 38, and thus minimizing wear potential with respect to any given calandria extension 58 and its respectively associated top plate 36, and of the interface between any given rod guide and its associated rodlet cluster. Thus, the potential of wear due both to axial sliding forces arising, for example, from core plate vibration and as well due to lateral forces resulting from differential thermal and other effects is greatly decreased, and the structure is self-compensating even as to any specific, individual connection with a given calandria extension 58 which has worn due, for example, to initial mechanical misalignment.

As can be appreciated from FIG. 10, only minimal axial space is required to accommodate the array of top plates 36 and 38 and the flexible linkages 130 therein, along with the vibration arrestors 140 (140'); this enables use of the flexible rod guide support structure without requiring any modification of the vessel 10 to accommodate an axially elongated inner barrel assembly 24. As is clear from FIG. 9, taken further in the context of FIGS. 1 and 8, the flexible support structure incorporating the streamlined and low profile vibration arrestors 140 and 140' of the present invention does not interfere with the required free passage of core outlet flow through the openings 59 provided therefor in the lower calandria plate 52.

In accordance with the foregoing, first and second embodiments of the vibration arrestors of the invention have been disclosed, respectively comprising a single pair of aligned spring arms 140-1 and 141-2 of the vibration arrestor 140 and a double pair of spring arms 141-1' to 141-4', in quadrature relationship, of the arrestor 140'. Whereas these are preferred configurations, the specific number and relative orientation of the spring arms is understood to be a function of the geometry of the arrays of the top plates with which the spring arms are used and thus are not to be deemed limiting. Accordingly, it will be apparent to those of skill in the art that numerous modifications and adaptations of the invention may be achieved and accordingly it is intended by the appended claims to cover all such modifications and adaptations as fall within the true spirit and scope of the invention.

We claim as our invention:

1. In a pressure vessel of a pressurized water reactor system, the vessel having a support plate having a generally planar surface and a plurality of generally cylindrical, rigid extensions protruding from the planar surface thereof in a predetermined array of regularly spaced positions, and a plurality of further plates supported in a substantially common plane, parallel to and spaced from the support plate, each further plate having a central aperture therein received over a corresponding said cylindrical extension, a vibration arrester comprising:

a central hub having a central aperture therein for being received over a corresponding extension and engaging the generally planar surface of the support plate;

at least a pair of spring arms integral with said central hub and extending in aligned, oppositely oriented directions from said central hub and depending at corresponding angles away from said central hub, said spring arms being of a common length sufficient to engage the corresponding extremities thereof on the respective further plates received on the extensions of the predetermined array thereof aligned with said spring arms and positioned next adjacent said corresponding extension on which said central hub is received and to exert a compressive force thereon, within a predetermined range, for resiliently opposing any reduction of the parallel spacing and reacting lateral loads tending to displace the further plates in a direction parallel to the common plane;

a stiffening ring having a periphery generally corersponding to the periphery of said central hub; and means for connecting said stiffening ring to said support plate with said central hub of said arrestor therebetween.

2. A vibration arrestor as recited in claim 1, wherein:
   said central hub is of generally annular configuration and includes enlarged portions extending in alignment with the respective integral spring arms; and
   said stiffening ring is of generally annular configuration and includes lateral extensions corresponding to and having a common periphery with said enlarged portions of said central hub.

3. A vibration arrestor as recited in claim 2, wherein said connecting means comprises:

apertures in said enlarged portions of said central hub aligned with said respective spring arms;

apertures in said lateral extensions of said stiffening ring disposed in alignment with the corresponding apertures in said enlarged portions of said hub;

threaded bores in the support plate associated with each said vibration arrestor, in positions with which said corresponding apertures in said enlarged portions of said central hub and in said respective spring arms are aligned, when said spring arms are positioned to engage the respective, next adjacent further plates; and bolts received through the respective said aligned apertures of said stiffening ring and said hub and engaged in the respective threaded bores of the support plate.

4. A vibration arrestor as recited in claim 3, further comprising:

first and second pairs of spring arms integrally formed with said hub, the arms of each pair extending in aligned, oppositely oriented relationship relatively to the hub and the two pairs being angularly displaced from each other, said respective spring arms of said first and second pairs being of corresponding, common lengths for engaging the corresponding extremities thereof on the respective further plates received on the extensions of the predetermined array thereof aligned with the respective said first and second pairs of spring arms in accordance with the angular displacement therebetween.

5. A vibration arrestor as recited in claim 1, wherein said connecting means comprises:

apertures in said central hub aligned with said respective spring arms;

apertures in said stiffening ring disposed in alignment with the corresponding apertures in said hub;

threaded bores in the support plate associated with each said vibration arrestor, in positions with which said corresponding apertures in said central hub and in said respective spring arms are aligned, when said spring arms are positioned to engage the respective, next adjacent top plates; and bolts received through the respective said aligned apertures of said stiffening ring and said hub and engaged in the respective threaded bores of th support plate.

6. A vibration arrestor as recited in claim 1, further comprising:

first and second pairs of spring arms integrally formed with said hub, the arms of each pair extending in aligned, oppositely oriented relationship relatively to the hub and the two pairs being angularly displaced from each other.

7. In a pressure vessel of a pressurized water reactor system, the vessel having at least first and second pluralities of rod guides of respective, at least first and second different types disposed as corresponding, at least first and second interleaved matrices thereof in parallel axial relationship within an inner barrel assembly of the pressure vessel, the first and second pluralities of rod guides receiving therein respective, at least first and second different types of rod clusters, the inner barrel assembly occupying a central portion of the vessel and being of a vertical height extending from a first plate of a lower elevation to a second plate of a higher elevation, each of said rod guides being of elongated configuration and of an axial length corresponding substantially to the vertical height of said inner barrel assembly, the bottom ends thereof being affixed to said first plate and the top ends thereof being disposed adjacent said second plate, a support structure for the upper ends of the rod guides comprising:

at least first and second matrices of plural top support plates of corresponding, at least first and second different types, disposed on and connected to the respective top ends of said corresponding pluralities of rod guides of said at least first and second types;

said top support plates of said at least first and second different types having respective, mating interior and exterior vertices for assembling the respective said top support plates of said matrices thereof in interdigitated relationship with exterior vertics of one said type received in mating relationship by said interior vertices of another said type;

a plurality of extensions depending from said second plate in a predetermined array respectively corresponding to the plurality of top plates of at least a selected one of said at least first and second different types, said top plates of each said selected at least one type having central receiving apertures therein for receiving respectively corresponding ones of said depending extensions thereby to axially align same within said inner barrel assembly;

a plurality of vibration arrestors respectively associated with said top plates of said selected type, each said vibration arrestor comprising:

a central hub having a central aperture therein for being received over a corresponding, said extension associated with a top plate of a said selected type and engaging the lower surface of the second plate;

at least of a pair of spring arms integral with said central hub and extending in aligned, oppositely oriented directions from said central hub and depending at corresponding angles away from said central hub, said spring arms being of a common length sufficient to engage the corresponding extremities thereof on the respective top plates of the selected type received on the extensions of the predetermined array thereof aligned with said spring arms and positioned next adjacent said corresponding extension on which said central hub is received and to exert a compressive force thereon, within a predetermined range, for resiliently opposing any reduction of the parallel spacing and reacting lateral loads tending to displace the top plates of the selected type in a direction parallel to the common plane;

a stiffening ring having a periphery generally corresponding to the periphery of said central hub; and means for connecting said stiffening ring to said second plate with said central hub of said arrestor therebetween.

8. A support structure as recited in claim 7, wherein:

said central hub of said vibration arrestor is of generally annular configuration and includes enlarged portions extending in alignment with the respective integral spring arms; and said stiffening ring of said vibration arrestor is of generally annular configuration and includes lateral extensions corresponding to and having a common periphery with said enlarged portions of said central hub.

9. A support structure as recited in claim 8, wherein said connecting means of said vibration arrestor comprises:

apertures in said enlarged portions of said central hub aligned with said respective spring arms;

apertures in said lateral extensions of said stiffening ring disposed in alignment with the corresponding apertures in said enlarged portions of said hub;

threaded bores in the support plate associated with each said vibration arrestor, in positions with which said corresponding apertures in said enlarged portions of said central hub and in said respective spring arms are aligned, when said spring are positioned to engage the respective, next adjacent top plates; and bolts received through the respective said aligned apertures of said stiffening ring and said hub and engaged in the respective threaded bores of the support plate.

10. A support structure as recited in claim 7, further comprising:

first and second pairs of spring arms integrally formed with said hub, the arms of each pair extending in aligned, oppositely oriented relationship relatively to the hub and the two pairs being angularly displaced from each other, said respective spring arms of said first and second pairs being of corresponding, common lengths for engaging the corresponding extremities thereof on the respective top plates of the selected type received on the extensions of the predetermined array thereof aligned with the respective said first and second pairs of spring arms in accordance with the angular displacement therebetween.

11. A support structure as recited in claim 10, wherein:

said vibration arrestors are received only on said extensions associated with alternate rows within said array of said top plates of the selected type; and there is further provided:

a flexible linkage interconnecting a given top plate of one of said types with each contiguous top plate of the other of said types having the respective said vertices thereof in mating relationship, thereby to interconnect all of said top plates of all of said types in a concatenated relationship.

12. A pressurized water reactor system having a vessel including an inner barrel assembly within which are disposed at least first and second pluralities of rod guides of respective, at least first and second different types in corresponding, at least first and second interleaved matrices thereof and in parallel axial relationship, said first and second pluralities of rod guides receiving therein respective, at least first and second different types of rod clusters, the inner barrel assembly occupying a central portion of the vessel and being of a vertical height extending from a first plate of a lower elevation to a second plate of a higher elevation, each of said rod guides being of elongated configuration and of an axial length corresponding substantially to the vertical height of said inner barrel assembly, the bottom ends thereof being affixed to said first plate and the top ends thereof being disposed adjacent said second plate, and a support structure for the upper ends of said rod guides comprising:

at least first and second matrices of plural top support plates of corresponding, at least first and second different types, disposed on and connected to the respective top ends of said corresponding pluralities of rod guides of said at least first and second types;

said top support plates of said at least first and second different types having respective, mating interior and exterior vertices for assembling the respective said top support plates of said matrices thereof in interdigitated relationship with exterior vertices of one said type received in mating relationship by said interior vertices of another said type;

a plurality of extensions depending from said second plate in a predetermined array respectively corresponding to the plurality of top plates of at least a selected one of said at least first and second different types, said top plates of each said selected type having central receiving apertures therein for receiving respectively corresponding ones of said depending extensions thereby to axially align same within said inner barrel assembly;

a plurality of vibration arrestors respectively associated with said top plates of said selected type, each said vibration arrestor comprising:

a central hub having a central aperture therein for being received over a corresponding, said extension associated with a top plate of a said selected type and engaging the lower surface of the second plate;

at least of a pair of spring arms integral with said central hub and extending in aligned, oppositely oriented directions from said central hub and depending at corresponding angles away from said central hub, said spring arms being of a common length sufficient to engage the corresponding extremities thereof on the respective top plates of the selected type received on the extensions of the predetermined array thereof aligned with said spring arms and positioned next adjacent said corresponding extension on which said central hub is received and to exert a compressive force thereon, within a predetermined range, for resiliently opposing any reduction of the parallel spacing and reacting lateral loads tending to displace the top plates of the selected type in a direction parallel to the common plane;

a stiffening ring having a periphery generally corresponding to the periphery of said central hub; and means for connecting said stiffening ring to said second plate with said central hub of said arrestor therebetween.

13. A reactor system as recited in claim 12, wherein:

said central hub of said vibration arrestor is of generally annular configuration and includes enlarged portions extending in alignment with the respective integral spring arms; and said stiffening ring of said vibration arrestor is of generally annular configuration and includes lateral extensions correspondrng to and having a common periphery with said enlarged portions of said central hub.

14. A support structure as recited in claim 13, wherein said connecting means of said vibration arrestor comprises:

apertures in said enlarged portions of said central hub aligned with said respective spring arms;

apertures in said lateral extensions of said stiffening ring disposed in alignment with the corresponding apertures in said enlarged portions of said hub;

threaded bores in the support plate associated with each said vibration arrestor, in positions with which said corresponding apertures in said enlarged portions of said central hub and in said respective spring arms are aligned, when said spring are positioned to engage the respective, next adjacent top plates; and bolts received through the respective said aligned apertures of said stiffening ring and said hub and engaged in the respective threaded bores of the support plate.

15. A support structure as recited in claim 12, further comprising:

first and second pairs of spring arms integrally formed with said hub, the arms of each pair extending in aligned, oppositely oriented relationship relatively to the hub and the two pairs being angularly displaced from each other, said respective spring arms of said first and second pairs being of corresponding, common lengths for engaging the corresponding extremities thereof on the respective top plates of the selected type received on the extensions of the predetermined array thereof aligned with the respective said first and second pairs of spring arms in accordance with the angular displacement therebetween.

16. A support structure as recited in claim 15, wherein:

said vibration arrestors are received only on said extensions associated with alternate rows within said array of said top plates of the selected type; and there is further provided:

a flexible linkage interconnecting a given top plate of one of said types with each contiguous top plate of the other of said types having the respective said vertices thereof in mating relationship, thereby to interconnect all of said top plates of all of said types in a concatenated relationship.

* * * * *